(12) United States Patent
Tetreault et al.

(10) Patent No.: US 12,270,407 B2
(45) Date of Patent: Apr. 8, 2025

(54) FAN SPEED AND LIGHT STATE DETECTION FOR CEILING FANS

(71) Applicant: Hubbell Incorporated, Shelton, CT (US)

(72) Inventors: Michael Dennis Tetreault, Simsbury, CT (US); Nicholas Charles Kraus, Enfield, CT (US)

(73) Assignee: Hubbell Incorporated, Shelton, CT (US)

( * ) Notice: Subject to any disclaimer, the term of this patent is extended or adjusted under 35 U.S.C. 154(b) by 158 days.

(21) Appl. No.: 17/773,386

(22) PCT Filed: Oct. 29, 2020

(86) PCT No.: PCT/US2020/057994
§ 371 (c)(1),
(2) Date: Apr. 29, 2022

(87) PCT Pub. No.: WO2021/087135
PCT Pub. Date: May 6, 2021

(65) Prior Publication Data
US 2023/0065003 A1    Mar. 2, 2023

Related U.S. Application Data

(60) Provisional application No. 62/928,419, filed on Oct. 31, 2019.

(51) Int. Cl.
*H02P 23/14*      (2006.01)
*F04D 25/06*      (2006.01)
(Continued)

(52) U.S. Cl.
CPC ........... *F04D 25/088* (2013.01); *F04D 25/06* (2013.01); *H02P 23/14* (2013.01); *H05B 47/14* (2020.01)

(58) Field of Classification Search
CPC ...... F04D 25/06; F04D 25/088; F04D 27/004; H02P 23/14; H05B 47/14
See application file for complete search history.

(56) References Cited

U.S. PATENT DOCUMENTS 9,551,356 B2 *   1/2017   Leesman ............... F04D 29/526
9,901,039 B1 *   2/2018   Dellerson ............... A01G 9/20
(Continued)

OTHER PUBLICATIONS

International Search Report and Written Opinion mailed in Application No. PCT/US2020/057994, dated Jan. 26, 2021.

*Primary Examiner* — Thai T Dinh
(74) *Attorney, Agent, or Firm* — Robinson + Cole LLP

(57) ABSTRACT

A fan controller for a ceiling fan is provided. The fan controller includes one or more switching devices configured to selectively couple the ceiling fan to a power source. The fan controller further includes a power meter circuit and one or more control devices. The one or more control devices are configured to obtain, via the power meter circuit, data indicative of power consumption of a fan motor of the ceiling. The one or more control devices are configured to determine the fan motor is configured in a first mode of a plurality of modes for the fan motor based, at least in part, on the data indicative of power consumption. The one or more control devices are configured to provide a notification to manipulate an input device on the ceiling fan to switch the fan motor from the first mode to a second mode of the plurality of modes.

20 Claims, 8 Drawing Sheets

(51) Int. Cl.
  *F04D 25/08*    (2006.01)
  *H05B 47/14*    (2020.01)

(56) References Cited

U.S. PATENT DOCUMENTS

| | | | | |
|---|---|---|---|---|
| 10,975,874 | B2* | 4/2021 | Monteith | F24F 1/0047 |
| 11,009,033 | B2* | 5/2021 | Smith | F04D 25/068 |
| 11,384,948 | B2* | 7/2022 | Desmet | F24F 11/58 |
| 11,486,404 | B1* | 11/2022 | Mathis | H05B 47/19 |
| 2007/0057805 | A1 | 3/2007 | Gomez | |
| 2015/0325112 | A1* | 11/2015 | McPherson | G08C 17/02 |
| | | | | 455/419 |
| 2016/0047391 | A1 | 2/2016 | McPherson et al. | |
| 2017/0089346 | A1 | 3/2017 | Oleson et al. | |
| 2017/0101999 | A1* | 4/2017 | Smith | F04D 25/088 |
| 2017/0115019 | A1* | 4/2017 | Desmet | H05B 47/115 |

\* cited by examiner

FAN SPEED AND LIGHT STATE DETECTION FOR CEILING FANS

RELATED APPLICATIONS

This application claims the benefit of prior-filed, U.S. Provisional Patent Application No. 62/928,419, filed Oct. 31, 2019, the entire contents of which are incorporated by reference.

FIELD

The present disclosure relates generally to ceiling fans.

BACKGROUND

Ceiling fans can include a plurality of fan blades and a fan motor. The fan motor can be configured to drive rotation of the fan blades to circulate air within a space. Typical ceiling fans can further include a pull-chain switch that a user can pull to toggle between a plurality of modes for the fan motor. For instance, the user can pull the pull-chain switch to switch the fan motor from a first mode in which the fan motor is not coupled to a power source to a second mode in which the fan motor is coupled to the power source such that the fan motor can rotates the fan blades. Additionally, the user can pull the pull-chain switch to adjust a speed at which the fan motor rotates the fan blades. For instance, the user can pull the pull-chain switch to toggle between a plurality of speed settings (e.g., low, medium, high) for the fan motor.

SUMMARY

Aspects and advantages of embodiments of the present disclosure will be set forth in part in the following description, or may be learned from the description, or may be learned through practice of the embodiments.

In one aspect, a fan controller for a ceiling fan is provided. The fan controller includes one or more switching devices configured to selectively couple the ceiling fan to a power source. The fan controller further includes a power meter circuit and one or more control devices. The one or more control devices are configured to obtain, via the power meter circuit, data indicative of power consumption of a fan motor of the ceiling. The one or more control devices are configured to determine the fan motor is configured in a first mode of a plurality of modes for the fan motor based, at least in part, on the data indicative of power consumption. The one or more control devices are configured to provide a notification to manipulate an input device physically located on the ceiling fan to switch the fan motor from the first mode to a second mode of the plurality of modes.

Other examples aspects of the present disclosure are directed to apparatus, methods, electronic devices, non-transitory computer-readable media, and systems.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
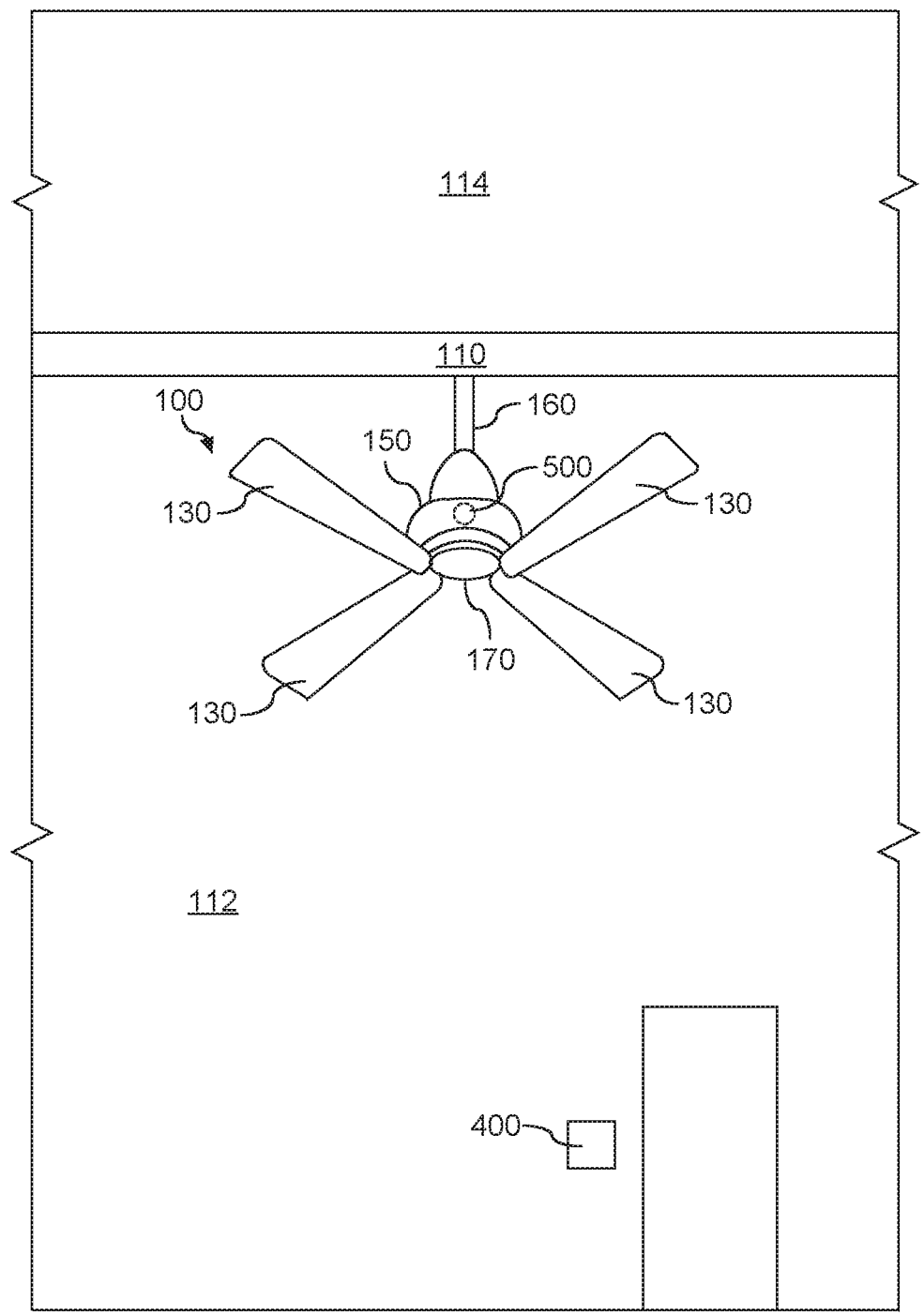
FIG. 1 depicts a ceiling fan according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to ceiling fans. Typical ceiling fans can include one or more input devices physically located on the ceiling fan. The one or more input devices can be configured to receive a manual user-input associated with configuring one or more electrical loads of the ceiling fan in a plurality of different operating modes. For instance, the one or more input devices can include a pull-chain switch that can be manipulated (e.g. pulled) by a user to toggle between a plurality of operating modes for a fan motor of the ceiling fan. For example, the user can pull the pull-chain switch to activate (e.g., turn on) and deactivate (e.g., turn off) the fan motor. Furthermore, in some implementations, the user can pull the pull-chain switch to adjust a speed at which the fan motor rotates fan blades of the ceiling fan.

In some implementations, ceiling fans can include a pull-chain switch that can be manipulated (e.g., pulled) by the user to toggle between a plurality of operating modes for a light source of the ceiling fan. For example, the light source can be a non-dimmable light source, and the user can pull the pull-chain switch to selectively couple the non-dimmable light source to a power source. As another example, the light source can be a dimmable light source, and the user can pull the pull-chain switch to toggle between the plurality of operating modes for the dimmable light source to adjust the intensity (e.g., brightness) of light emitted by the dimmable light source.

Example aspects of the present disclosure are directed to a fan controller for a ceiling fan. In some implementations, the fan controller can include an in-wall controller and a canopy controller. The in-wall controller can be separate from the ceiling fan. The canopy controller can be positioned within a housing of the ceiling fan. In alternative implementations, the fan controller can be onboard the ceiling fan. For instance, the fan controller can be disposed within a housing of the ceiling fan. In some implementations, the fan controller can include a power meter circuit configured to monitor power consumption of the fan motor of the ceiling fan. Additionally, the fan controller can include a power meter circuit configured to monitor power consumption of a light source of the ceiling fan.

In some implementations, the fan controller can be configured to determine a current mode of the electrical load (e.g., fan motor, light source) based, at least in part, on data obtained via the power meter circuit and indicative of power consumption of the electrical load. As will be discussed below in more detail, the fan controller can be further configured to determine whether the current mode of the electrical load precludes the fan controller from switching the electrical load from the current mode to another mode of the plurality of modes in which the electrical load can be configured.

In some implementations, the fan controller can determine a current mode of the fan motor and/or light source as set by an input device physically located on the ceiling fan (e.g., a pull chain switch) corresponds to a first mode in which the fan motor is decoupled from the power source. However, since the input device has limited the fan motor and/or light source to the first mode in which the fan motor and/or light source is deactivated (e.g., decoupled from the power source), the fan controller cannot switch the fan motor and/or light source from the first mode to a second mode in which the fan motor and/or light source is coupled to the power source.

In some implementations, the fan controller can determine the current mode of the fan motor as set by the input device corresponds to a first mode in which the fan motor is coupled to the power source such that the fan motor rotates the fan blades at a first speed. However, since the input device has limited the fan motor to the first mode in which the fan motor rotates the fan blades at the first speed, the fan controller cannot switch the fan motor from the first mode to a second mode in which the fan motor rotates the fan blades at a second speed that is faster than the first speed.

In such instances as those discussed above, the fan controller can be configured to provide a notification to prompt the user to manipulate (e.g., pull) the input device physically located on the ceiling fan to switch the current mode of the electrical load (e.g., fan motor, light source, etc.) from the first mode to a second mode that does not preclude the fan controller from switching the electrical load to another mode of the plurality of modes. For instance, the notification may be provided to a user device (e.g., smartphone, tablet, etc.) associated with the user and may prompt the user to manipulate the pull chain switch to configure the fan motor in a mode in which the fan motor can rotate the fan blades at a maximum speed setting. Other suitable notifications (e.g., visual, audio, vibratory) can be used without deviating from the scope of the present disclosure.

The fan controller according to example embodiments of the present disclosure provides numerous technical benefits. For instance, the power meter circuit allows the fan controller to determine a current mode of an electrical load (e.g., fan motor, light source) of the ceiling fan. Furthermore, the fan controller can determine whether the current mode of the electrical load limits control of the fan controller. In particular, the fan controller can determine whether the current mode of the electrical load prevents the fan controller from switching the electrical load from the current mode to another mode of a plurality of modes in which the electrical load can be configured. In addition, the fan controller can provide a notification to a user to manipulate an input device physically located on the ceiling fan to switch the current mode of the electrical load to another mode that does not limit control of the electrical load via the fan controller. In this manner, control of the electrical load via the fan controller can be improved.

Referring now to the FIGS., FIGS. 1 through 4 depict a ceiling fan 100 according to example embodiments of the present disclosure. The ceiling fan 100 can be removably mounted to a ceiling 110 separating a first space 112 (e.g., positioned beneath the ceiling 110) from a second space 114 (e.g., positioned above the ceiling 110). In some implementations, the ceiling fan 100 can include a plurality of fan blades 130. As shown, each of the plurality of fan blades 130 can be coupled to a blade hub 132 of the ceiling fan 100. More specifically, each of the fan blades 130 can be coupled to the blade hub 132 via a blade arm 134 such that the fan blades 130 are spaced apart from one another along a circumferential direction C. It should be appreciated that any suitable type of fastener (e.g., screw) can be used to couple the blade arm 134 to the blade hub 132 and a corresponding fan blade.

As shown, the ceiling fan 100 can include a fan motor 140. The fan motor 140 can be configured to receive an input power from a power source (e.g., alternating current (AC) power source, direct current (DC) power source) for the ceiling fan 100. Furthermore, the fan motor 140 can be operatively coupled to the fan blades 130 via the blade hub 132. In this manner, the fan motor 140 can convert the input power received from the power source into mechanical energy needed to drive rotation of the fan blades 130. In some implementations, the fan motor 140 can be configured to drive rotation of the fan blades 130 in a first direction D1 or a second direction D2 that is different than the first direction D1. For instance, the plurality of fan blades 130 can move air in the first space 112 towards the ceiling 110 when the fan motor 140 drives rotation of the fan blades 130 in the first direction D1. Conversely, the fan blades 130 can move air away (e.g., downward) from the ceiling 110 when the fan motor 140 drives rotation of the fan blades 130 in the second direction D2.

In some implementations, the ceiling fan 100 can include a housing 150 configured to accommodate the fan motor 140. As shown, the fan motor 140 can be positioned within a cavity 152 defined by the housing 150. In some implementations, the ceiling fan 100 can include a cover 154 that can be removably mounted to the housing 150 via one or more fasteners (e.g., screws). In some implementations, the fan motor 140 can be hidden from view when the cover 154 is mounted the housing 150 via the one or more fasteners.

In some implementations, the ceiling fan 100 can include a downrod 160 having a first end 162 and a second end 164 spaced apart from the first end 162 along a length L of the downrod 160. The first end 162 of the downrod 160 can be coupled to a support (e.g., mounting bracket) positioned within the ceiling 110 or the second space 114. The second end 164 of the downrod 160 can be coupled to the housing 150. In this manner, the ceiling fan 100 can be suspended from the ceiling 110.

In some implementations, the ceiling fan 100 can include a light source 170. The light source 170 can be configured to illuminate the first space 112. In some implementations, the light source 170 can include one or more light emitting diode (LED) devices. It should be appreciated, however, that the ceiling fan 100 can include any suitable type of light source. For instance, in some implementations, the light source 170 can include one or more fluorescent light sources. In alternative implementations, the light source 170 can include one or more incandescent light sources.

Figure 4:
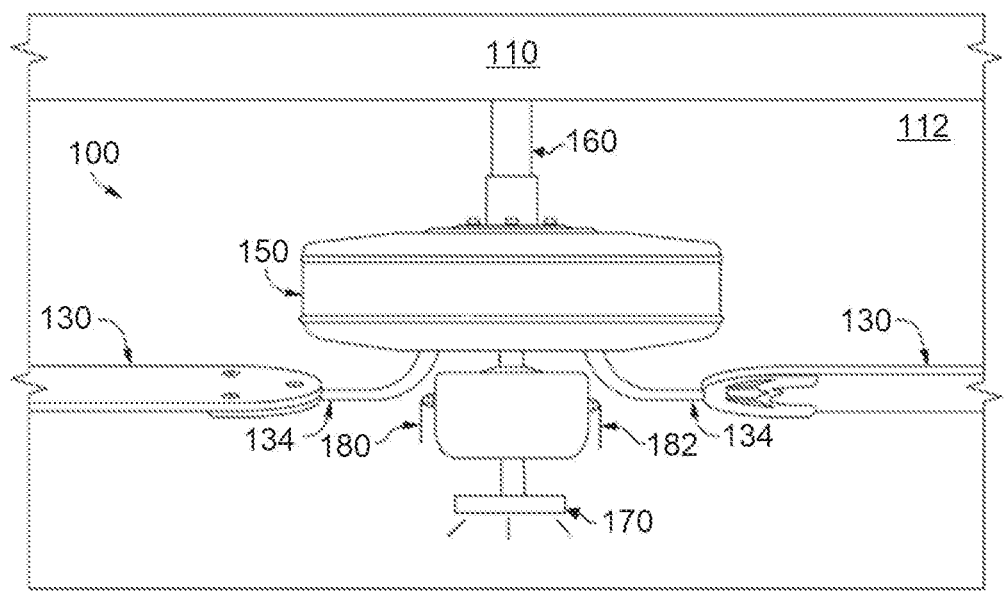
FIG. 4 depicts a ceiling fan having input devices configured to control operation of one or more electrical loads of the ceiling fan according to example embodiments of the present disclosure.

In some implementations, the ceiling fan 100 can include one or more input devices physically located on the ceiling fan 100. For instance, as shown in FIG. 4, the ceiling fan 100 can include a first input device 180 and a second input device 182. In some implementations, the first input device 180 and the second input device 182 can each be a pull-chain switch. As will be discussed below, the pull-chain switch can be manipulated (e.g., pulled) by a user to control operation of one or more electrical loads (e.g., fan motor 140, light source 170) of the ceiling fan 100.

The first input device 180 can be manipulated (e.g., pulled) by a user to toggle between a plurality of modes for the fan motor 140. For instance, the user can manipulate the first input device 180 to switch the fan motor 140 from a first mode in which the fan motor 140 is decoupled from a power source of the ceiling fan 100 to a second mode in which the fan motor 140 is coupled to the power source such that the fan motor 140 rotates the fan blades 130 at a first speed. As will be discussed below in more detail, the first input device 180 can, in some implementations, be used to adjust a speed at which the fan motor 140 rotates the fan blades 130.

In some implementations, the user can manipulate the first input device 180 again to switch the fan motor 140 from the second mode to a third mode in which the fan motor 140 is coupled to the power source for the ceiling fan 100 such that the fan motor 140 rotates the fan blades 130 at a second speed (e.g., medium) that is faster than the first speed (e.g., low). Furthermore, in some implementations, the user can manipulate the first input device 180 yet again to switch the fan motor 140 from the third mode to a fourth mode in which the fan motor 140 is coupled to the power source for the ceiling fan 100 such that the fan motor 140 rotates the fan blades at a third speed (e.g., fast) that is faster than the second speed (e.g., medium). In some implementations, the user can manipulate the first input device 180 again to switch the fan motor 140 from the fourth mode to the first mode such that the fan motor 140 is no longer coupled to the power source for the ceiling fan 100. However, it should be understood that, in alternative implementations, the fan motor 140 can be configured in more or fewer modes.

In some implementations, the second input device 182 can be manipulated (e.g., pulled) by the user to control operation of the light source 170. For instance, the user can manipulate the second input device 182 to switch the light source 170 from a first mode in which the light source 170 is decoupled from the power source for the ceiling fan 100 to a second mode in which the light source 170 is coupled to the power source such that the light source 170 emits light to illuminate the first space 112. As will be discussed below in more detail, the second input device 182 can, in some implementations, be used to adjust (e.g., dim, brighten) the light emitted by the light source 170.

In some implementations, the user can manipulate the second input device 182 to switch the light source 170 from the second mode to a third mode in which the light source 170 emits light that is brighter than the light the light source emits in the second mode. Furthermore, in some implementations, the user can manipulate the second input device 182 yet again to switch the light source 170 from the third mode to a fourth mode in which the light source 170 emits light that is brighter than the light the light source emits in the third mode. In some implementations, the user can manipulate the second input device 182 again to switch the light source 170 from the fourth mode to the first mode such that the light source 170 is no longer coupled to the power source for the ceiling fan 100. However, it should also be understood that the light source 170 can be configured in more or fewer modes.

Figure 5:
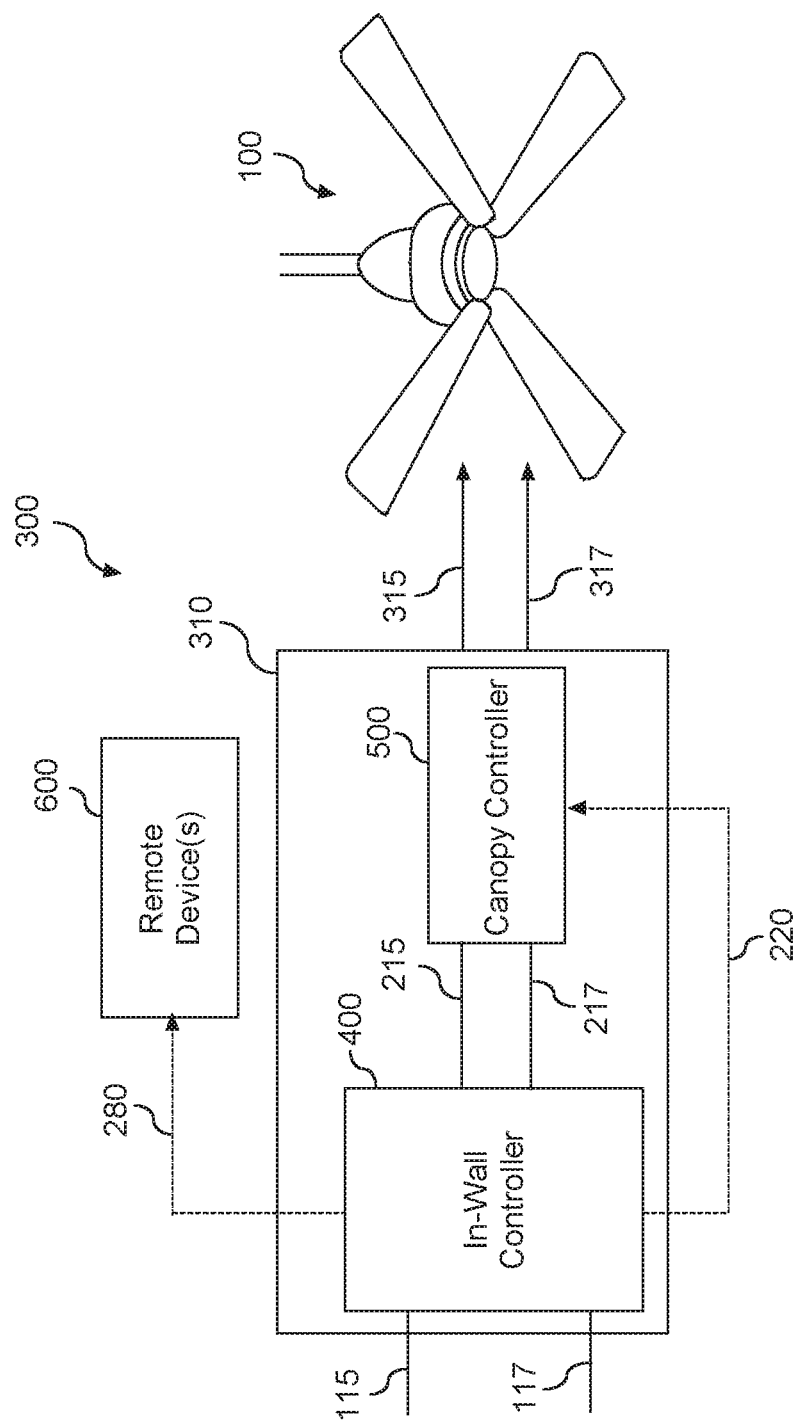
FIG. 5 depicts a fan system according to example embodiments of the present disclosure.

Referring now to FIG. 5, components of a fan system 300 are provided according to example embodiments of the present disclosure. As shown, the fan system 300 can include the ceiling fan 100 and a fan controller 310. In some implementations, the fan controller 310 can include an in-wall controller 400 and a canopy controller 500. The in-wall controller 400 can be positioned in a wall defining the first space 112 (FIG. 1) in which the ceiling fan 100 is located. The canopy controller 500 can be positioned within the housing 150 (FIG. 2) of the ceiling fan 100.

Although the in-wall controller 400 and the canopy controller 500 are described as being in separate locations, it should be appreciated that, in some implementations, the in-wall controller 400 and the canopy controller 500 can be positioned at the same location. For instance, in some implementations, both the in-wall controller 400 and the canopy controller 500 can be positioned with the wall defining the first space 112 (FIG. 1) in which the ceiling fan 100 is located. Alternatively, both the in-wall controller 400 and the canopy controller 500 can be positioned within the housing 150 of the ceiling fan 100.

As shown, the in-wall controller 400 can receive power from a power source (e.g., breaker, panel, circuit, etc.) via conductors 115 and 117. Conductor 115 can be a load conductor. Conductor 117 can be a neutral conductor. Furthermore, the in-wall controller 400 can be configured to provide electrical power to the canopy controller 500 via electrical conductors 215 and 217. Electrical conductor 215 can be a load conductor and conductor 217 can be a neutral conductor. The canopy controller 500 can provide independent fan motor power 315 to the fan motor 14 (FIG. 2) and independent light source power 317 to the light source 170 (FIG. 1) of the ceiling fan 100.

The in-wall controller 400 can communicate with the canopy controller 500 via a first communication link 220. In this manner, the in-wall controller 400 can send one or more control commands to the canopy controller 500 via the first communication link 220 to control operation of the ceiling fan 100. In some implementations, the first communication link 220 can be a wireless communication link based on any suitable wireless communication protocol. For instance, in some implementations, the wireless communication link can be based on the Bluetooth Low Energy wireless communication protocol.

In some implementations, the in-wall controller 400 can be in communication with one or more remote devices 600, such as one or more computing devices, user devices, servers, cloud computing devices, etc. via a second communication link 280. In some implementations, the second communication link 280 can be a wireless communication link based on any suitable wireless communication protocol. For instance, in some implementations, the wireless communication link can be based on the IEEE 802.11 wireless communication protocol.

Figure 6:
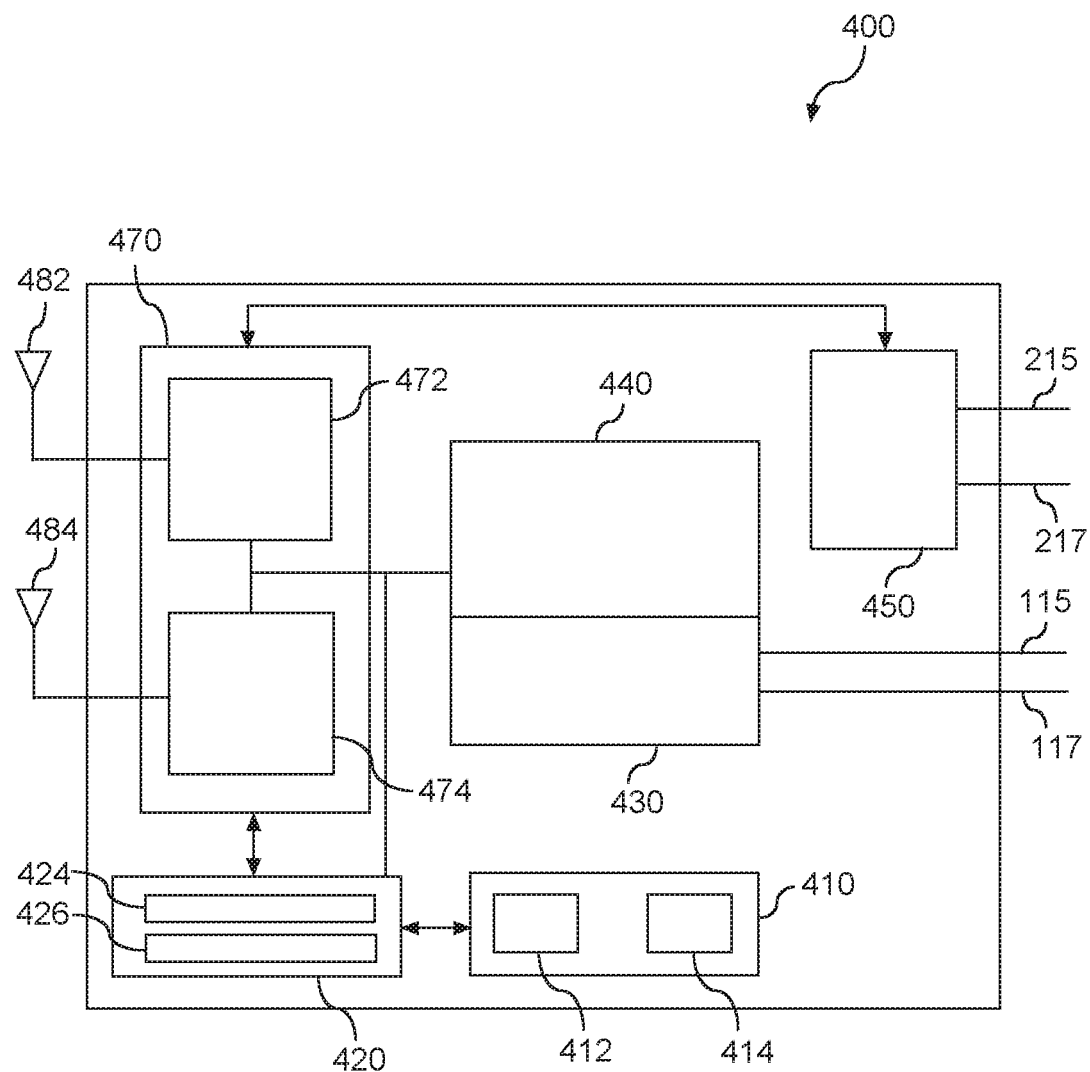
FIG. 6 depicts an example in-wall controller of a fan system according to example embodiments of the present disclosure.

Referring now to FIG. 6, a block diagram of components of the in-wall controller 400 is provided according to example embodiments of the present disclosure. In some implementations, the in-wall controller 400 can include interface circuitry 410 configured to process and/or manage various input and output devices associated with the in-wall controller 400. For instance, the interface circuitry 410 can process inputs from a user provided via buttons or other interface elements 412 (e.g., touchpad, contactless gestures, rocker buttons, toggle switches, dimmer knobs, etc.) on the in-wall controller 400. In this manner, a user can interact with the interface elements 412 to select an operating mode from a plurality of operating modes for one or more electrical loads (e.g., fan motor 140, light source 170) of the ceiling fan 100. For instance, the user can interact with the interface elements 412 to select a speed at which the fan motor 140 rotates the fan blades 130 of the ceiling fan 100. Alternatively, the user can interact with the interface elements 412 to activate (e.g., turn on) or deactivate (e.g., turn off) the light source 170.

In some implementations, the interface circuitry 410 can also include one or more drivers or other circuits used to control the illumination of indicators (e.g., LED indicators) on the in-wall controller 400. For instance, the interface circuitry 410 can include an LED driver used to power LEDs 414 to provide visual indicators to a user.

In some implementations, the in-wall controller 400 can include one or more control devices 420 that can be used to implement various functionality of the in-wall controller 400, such as any of the functionality described herein. For instance, the one or more control devices 420 can control the communication of data and/or control commands from the in-wall controller 400. The one or more control devices 420 can control the processing of inputs received via interface circuitry 410. The one or more control devices 420 can control the delivery of outputs (e.g., indicators) via the interface circuitry 410. In some implementations, the interface circuitry 410 can form a part or be included as the one or more control devices 420.

The one or more control devices 420 can include one or more processors 424 and one or more memory devices 426. The one or more processors 424 can be any suitable processing device, such as microprocessors, integrated circuits (e.g., application specific integrated circuits), field programmable gate arrays, etc. that perform operations to control components (e.g., any of the components described herein). The one or memory devices 426 can be any suitable media for storing computer-readable instructions and data. For instance, the one or more memory devices 426 can include random access memory such as dynamic random access memory (DRAM), static memory (SRAM) or other volatile memory. In addition, and/or in the alternative, the one or more memory devices can include non-volatile memory, such as ROM, PROM, EEPROM, flash memory, optical storage, magnetic storage, etc.

The one or more memory devices 426 can store computer-readable instructions that, when executed by the one or more processors 424, cause the one or more processors 424 to perform operations, such as any of the operations described herein. The instructions can be software written in any suitable programming language or can be implemented in hardware. The one or more memory devices 426 can also store data that can be obtained, received, accessed, written, manipulated, created, and/or stored.

In some implementations, the in-wall controller 400 can include a communication interface 470. The communication interface 470 can allow for the communication of data via, for instance, one or more wireless links using one or more antennas (e.g., antenna 482 and antenna 484). In some implementations, the communication interface 470 can include, for example, one or more of a communications controller, receiver, transceiver, transmitter, port, conductors, software, and/or hardware for communicating data.

As shown, the communication interface 470 can include a first circuit 472 for communicating data via antenna 482. In some implementations, the first circuit 472 can be configured to communicate data and other information, for instance, to another fan controller using Bluetooth Low Energy communication technology. The communication interface 470 can include a second circuit 474 for communicating data and other information (e.g., control commands) via antenna 484. For instance, the second circuit 374 can be configured to communicate data and other information, for instance, to a router, gateway, or other device using IEEE 802.11 communication technology.

In some implementations, the in-wall controller 400 can include a power meter circuit 430 configured to determine one or more parameters associated with electrical power flowing through the in-wall controller 400. The power meter circuit 430 can measure voltage and/or current flowing through conductor 115. Current can be measured, for instance, using a sense resistor. Voltage can be measured using, for instance, a voltage divider. Power flowing through the conductor 115 can be computed (e.g., using one or more processors 424 located on the in-wall controller 400 and/or remote from the in-wall controller 400) based on the measured current and voltage. In some implementations, the power meter circuit 430 can be a STPM32 metering circuitry manufactured by STMicroelectronics.

In some implementations, the in-wall controller 400 can include an AC to DC converter 440. The AC to DC converter 440 can convert AC power from conductor 115 and conductor 117 to DC power suitable for powering various components of the in-wall controller 400, such as communication interface 470, control devices 420, interface circuitry 410, etc.

In some implementations, the in-wall controller 400 can include one or more switching devices 450 (e.g., relay, power transistor, contactor, thyristor, etc.) for controlling the delivery of AC power from the in-wall controller 400 to one or more electrical loads of the ceiling fan 100 via electrical conductors 215 and 217. In some implementations, the one or more switching devices 450 can serve as an airgap switch to disconnect power from the one or more electrical loads of the ceiling fan 100.

Figure 7:
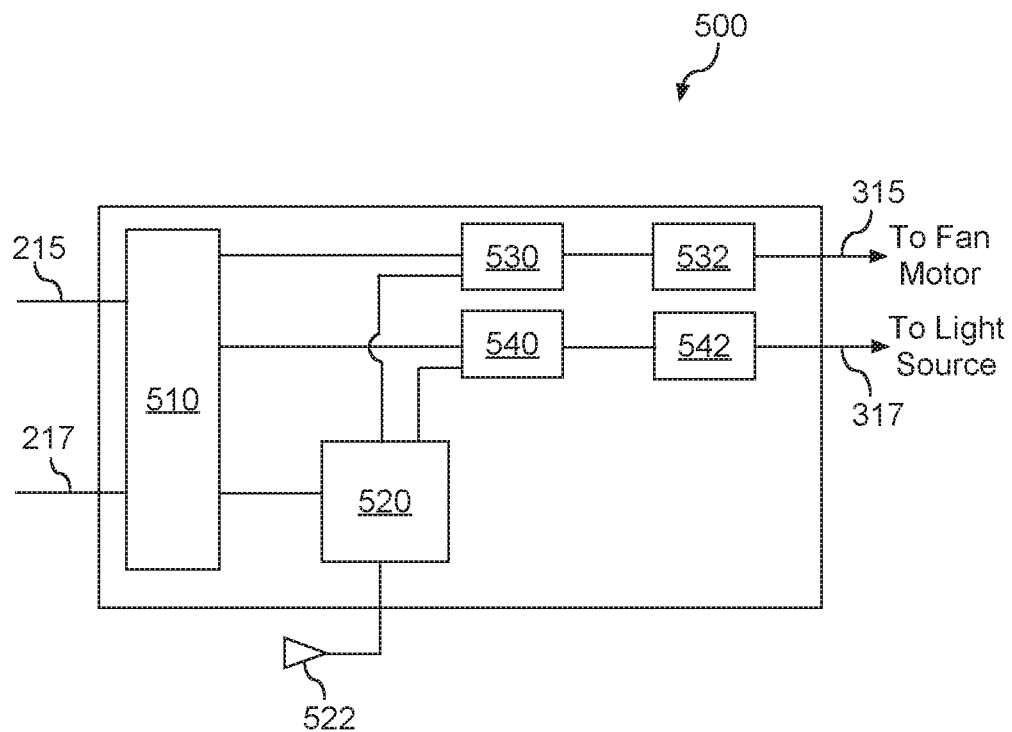
FIG. 7 depicts an example canopy controller of a fan system according to example embodiments of the present disclosure.

Referring now to FIG. 7, a block diagram of components of the canopy controller 500 is provided according to example embodiments of the present disclosure. The canopy controller 500 can receive AC power from the in-wall controller 400 (FIG. 5) via electrical conductors 215 and 217. In some implementations, the canopy controller 500 can include an AC to DC converter 510. The AC to DC converter 510 can be configured to convert the AC power provided via electrical conductors 215 and 217 to DC power suitable for powering various components of the canopy controller 500, such as a communication interface 520, a fan motor controller 530 and a light source controller 540.

The communication interface 520 can allow for the communication of data via, for instance, one or more wireless links using one or more antennas (e.g., antenna 522). For instance, the communication interface 520 can include one or more components to facilitate communication with the in-wall controller 400 (FIG. 5) via the first communication link 220 (FIG. 5). In this manner, the communication interface 520 can be configured to receive one or more control commands from the in-wall controller 400.

Figure 2:
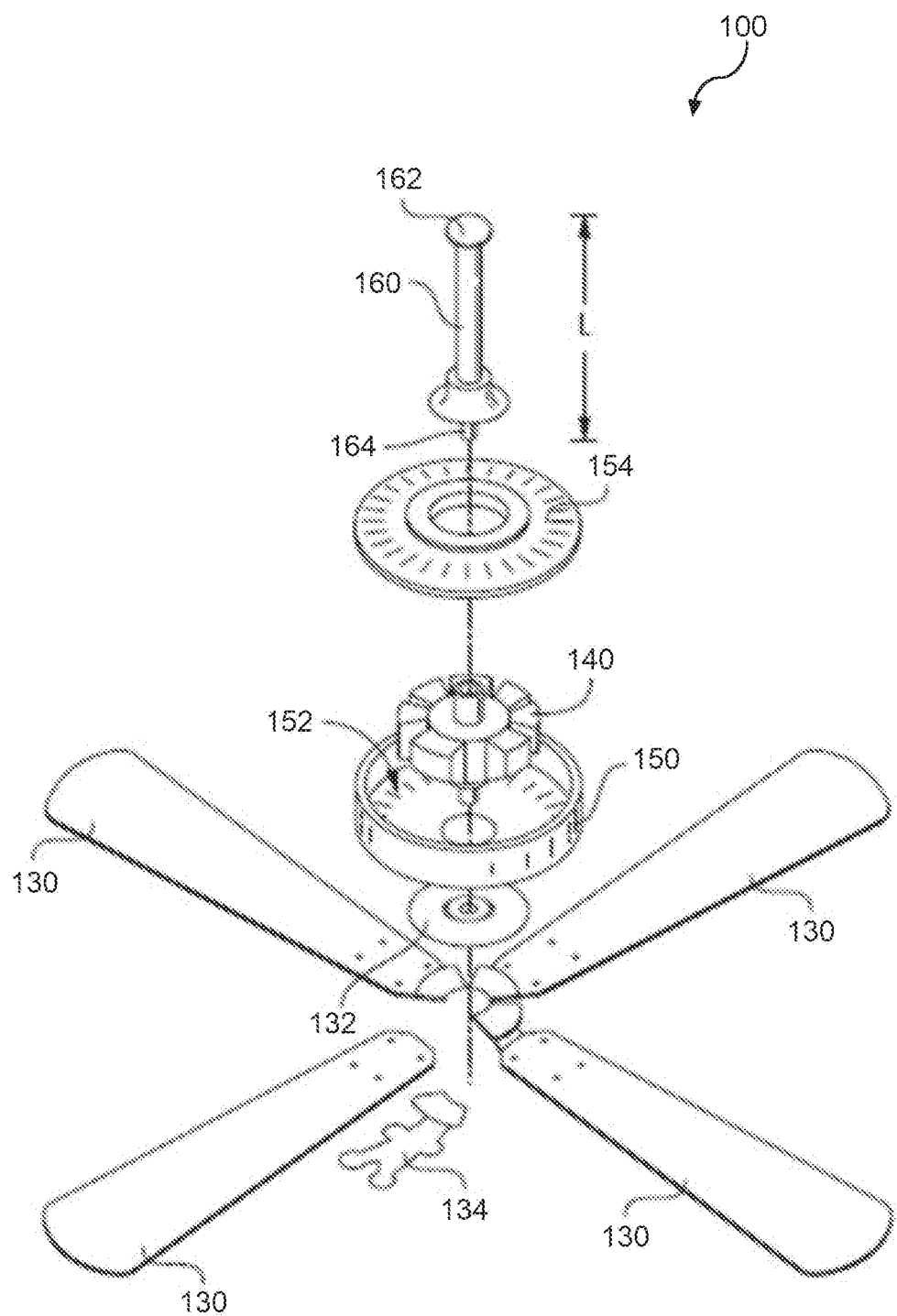
FIG. 2 depicts components of a ceiling fan according to example embodiments of the present disclosure.
Figure 3:
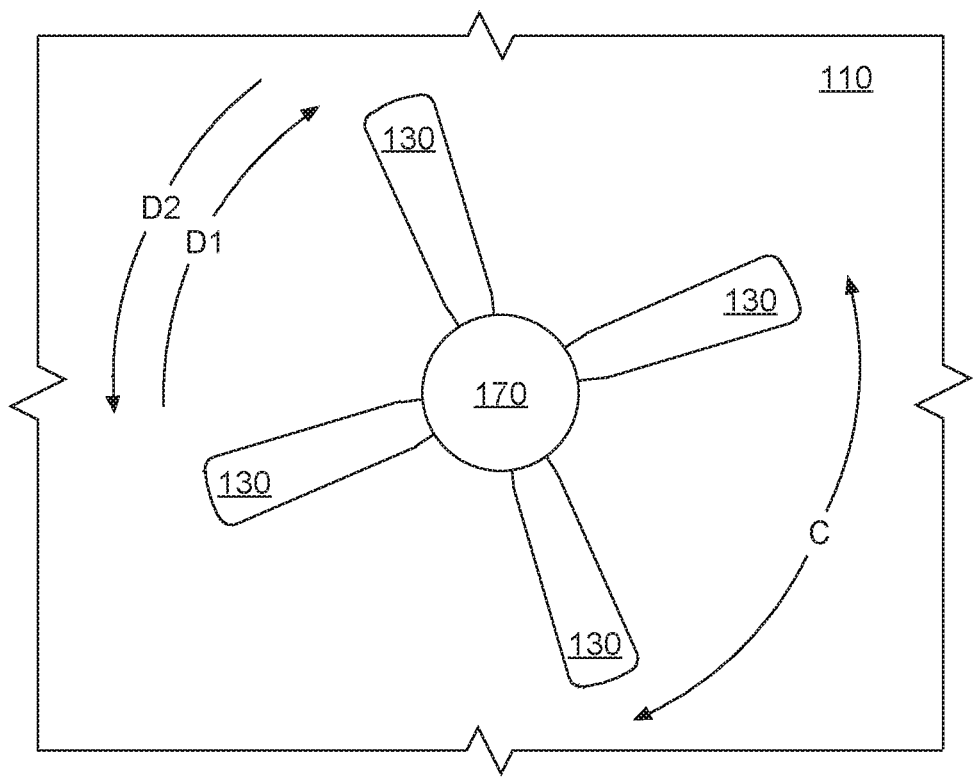
FIG. 3 depicts a bottom view of a ceiling fan according to example embodiments of the present disclosure.

The fan motor controller 530 can be configured to control operation of the fan motor 140 (FIG. 2). For instance, the fan motor controller 530 can be configured to process one or more control commands received from the in-wall controller 400 (FIG. 5) and associated with controlling operation of the fan motor 140 (FIG. 2). In some implementations, the one or more control commands can be associated with controlling a direction (e.g., first direction D1 or second direction D2) in which the fan motor 140 rotates the fan blades 130 (FIG. 1) of the ceiling fan 100. Alternatively or additionally, the one or more control commands can be associated with controlling a speed (e.g., low, medium, fast, etc.) at which the fan motor 140 rotates the fan blades 130.

In some implementations, the canopy controller 500 can include a power meter circuit 532 configured to measure one or more parameters (e.g., current, voltage, power factor, etc.) associated with the fan motor power 315 provided to the fan motor 140. Current can be measured, for instance, using a sensor resistor. Voltage can be measured using, for instance, a voltage divider. The fan motor power 315 can be computed (e.g., using one or more processors of the canopy controller 500 and/or remote from the canopy controller 500) based on the measured current and/or voltage.

The light source controller 540 can be configured to control operation of the light source 170 (FIG. 1) of the ceiling fan 100. For instance, the light source controller 540 can be configured to activate (e.g., turn on) or deactivate (e.g., turn off) the light source 170 based, at least in part, on one or more control commands the light source controller 540 receives from the in-wall controller 400 (FIG. 5). In implementations in which the light source 170 is a dimmable light source, the light source controller 550 can be further configured to configure the light source in one of a plurality of modes for the dimmable light source to control the intensity (e.g., brightness) of the light emitted by the light source 170.

In some implementations, the canopy controller 500 can include a power meter circuit 542 configured to measure one or more parameters (e.g., current, voltage, power factor, etc.) associated with the light source power 317 provided to the light source 170. Current can be measured, for instance, using a sensor resistor. Voltage can be measured using, for instance, a voltage divider. The light source power 317 can be computed (e.g., using one or more processors of the canopy controller 500 and/or remote from the canopy controller 500) based on the measured current and/or voltage. As will be discussed below in more detail, the fan controller 310 (e.g., in-wall controller 400, canopy controller 500) can be configured to determine a mode in which the fan motor 140 and/or the light source 170 are configured via the first input device 180 (FIG. 4) and the second input device 182 (FIG. 4), respectively, based, at least in part, on the power consumption data obtained via the power meter circuit 532, 542. Furthermore, the fan controller 310 can be configured to determine whether the mode in which the fan motor 140 and/or the light source 170 are configured via the first input device 180 and the second input device 182, respectively, prevents the fan controller 310 from switching the fan motor 140 and/or the light source 170 into another mode of a plurality of modes in which the fan motor 140 and/or the light source 170 can be configured.

Figure 8:
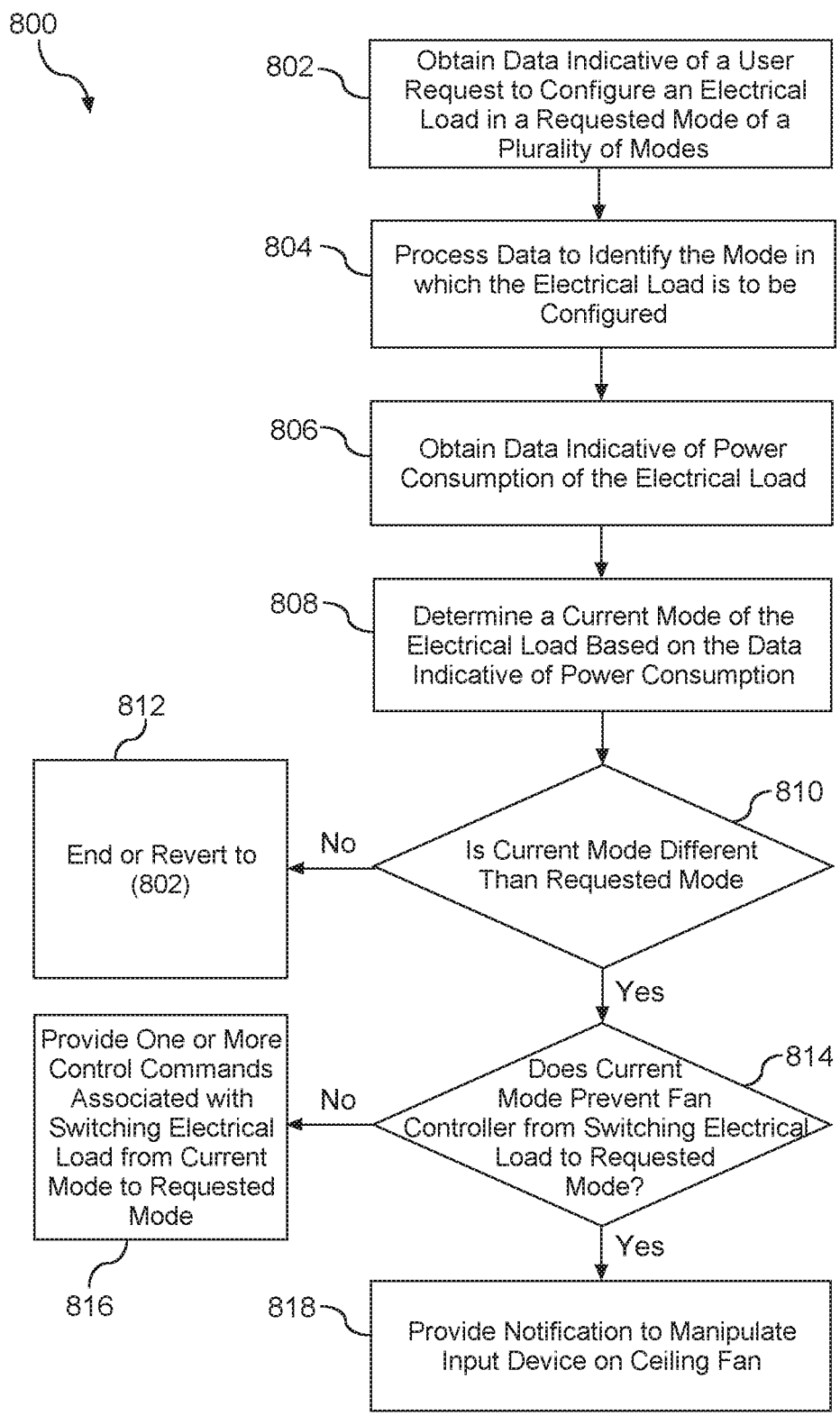
FIG. 8 depicts a flow diagram of a method for configuring a fan system according to example embodiments of the present disclosure.

Referring now to FIG. 8, a flow diagram of a method 800 for configuring a fan system according to example embodiments of the present disclosure is provided. The method 800 can be implemented, for instance, using the fan system 300 discussed above with reference to FIGS. 5-7. FIG. 8 depicts steps performed in a particular order for purposes of illustration and discussion. Those of ordinary skill in the art, using the disclosures provided herein, will understand that various steps of any of the methods described herein, will understand that various steps of any of the methods described herein can be adapted, expanded, omitted, rearranged, performed simultaneously, and/or modified in various ways without deviating from the scope of the present disclosure.

At (802), the method 800 can include obtaining data indicative of a user input to configure an electrical load (e.g., fan motor, light source) of the ceiling fan in one of a plurality of modes. In some implementations, the user input can be obtained via one or more interface elements of an in-wall controller of the fan system. In alternative implementations, the user input can be provided via a user interface implemented on a remote device that is communicatively coupled to the in-wall controller. It should be appreciated, however, that the data indicative of the user input can come from other sources without deviating from the scope of the present disclosure. For instance, in some implementations, the data indicative of the user input can include one or more voice commands spoken by a user.

At (804), the method 800 can include processing the data indicative of the user input to identify the mode in which the electrical load is requested to be configured. For instance, the user input can be indicative of a request to configure a fan motor of the ceiling fan in a mode in which the fan motor is coupled to a power source such that the fan motor rotates fan blades of the ceiling fan 100. Additionally, the user input may be indicative of a request to configure the fan motor in a mode in which the fan motor rotates the fan blades of the ceiling fan at a desired speed (e.g., slow, medium, fast). Alternatively or additionally, the user input can be indicative of a request to configure a light source of the ceiling fan in a mode in which the light source is coupled to a power source such that the light source illuminates a space in which the ceiling fan is located.

At (806), the method 800 can include obtaining data indicative of power consumption of the electrical load via a power meter circuit. For instance, the in-wall controller can obtain power consumption data for the electrical load from the canopy controller of the fan system.

At (808), the method 800 can include determining a current mode of the electrical load based, at least in part, on the data indicative of power consumption obtained at (806). In some implementations, the fan controller can be configured to determine the current mode of the electrical load based, at least in part, on a current drawn by the electrical load. Alternatively or additionally, the fan controller can be configured to determine the current mode of the electrical load based, at least in part, on a voltage associated with the electrical load. It should be appreciated, however, that the fan controller can be configured to determine the current mode of the electrical load based on any suitable parameter indicative of power consumption.

At (810), the method 800 can include determining whether a current mode of the electrical load set via one or more input devices physically located on the ceiling fan is different than the requested mode associated with the user input obtained at (802). If the requested mode for the electrical load corresponds (e.g., is the same as) to the current mode of the electrical load, the method 800 proceeds to (812). At (812), the method 800 can end or revert to (802). Otherwise, the method 800 proceeds to (814).

At (814), the method 800 includes determining whether the current mode of the electrical load as set by the input device (e.g., pull-chain switch) physically located on the ceiling fan precludes the fan controller from switching the electrical load to the requested mode associated with the user input obtained at (802).

For example, in some implementations, the electrical load can be the fan motor of the ceiling fan, and the current mode of the fan motor can correspond to a first mode in which the fan motor is decoupled from the power source. Furthermore, the requested mode can be associated with a second mode in which the fan motor is coupled to the power source such that the fan motor rotates fan blades of the ceiling fan. In such an instance, the fan controller cannot switch the fan motor from the first mode to the second mode, because the input device physically located on the ceiling fan has limited the fan motor to the first mode such that the fan motor cannot rotate the fan blades of the ceiling fan.

As another example, the current mode of the fan motor can correspond to a first mode in which the fan motor is coupled to a power source such that the fan motor rotates fan blades of the ceiling fan at a first speed (e.g., low). Furthermore, the requested mode can correspond to a second mode in which the fan motor is coupled to the power source such that the fan motor rotates fan blades of the ceiling fan at a second speed (e.g., medium, high) that is faster than the first speed (e.g., low). In such an instance, the fan controller cannot switch the fan motor from the current mode to the requested, because the input device has limited the fan motor to the current mode such that the fan motor rotates the fan blades at a lesser speed (e.g., the first speed).

As yet another example, the electrical load can be the light source, and the current mode of the light source can correspond to a first mode in which the light source is decoupled from a power source. Furthermore, the requested mode associated with the user input obtained at (802) can correspond to a second mode in which the light source is coupled to the power source such that the light source illuminates a space in which the ceiling fan is located. In such an instance, the fan controller cannot switch the light source from the first mode to the second mode, because the input device has limited the light source to the first mode such that the light source cannot illuminate the space in which the ceiling fan is located.

As still another example, the current mode of the light source can correspond to a first mode in which the light source emits light to illuminate the space in which the ceiling fan is located. Furthermore, the requested mode can correspond to a second mode in which the light source emits light that is brighter than the light emitted by the light source in the first mode. In such an instance, the fan controller cannot switch the light source from the first mode to the second mode, because the input device has limited the light source to the first mode such that the light source emits light that is not as bright as the light emitted by the light source when in the second mode.

If, at (814), the fan controller determines the current mode of the electrical load does not preclude the fan controller from switching the electrical load from the current mode to the requested mode, the method 800 proceeds to (816). Otherwise, the method proceeds to (818).

At (816), the method 800 includes providing one or more control commands associated with controlling operation of the electrical load such that the electrical load switches from the current mode to the requested mode. For instance, the in-wall controller can provide one or more control commands to the canopy controller to switch the electrical load from the current mode to the requested mode. Otherwise, the method 800 proceeds to (816).

At (818), the method 800 can include providing a notification to manipulate one or more input devices physically located on the ceiling fan to switch the fan motor from the current mode to a second mode of the plurality of modes that allows the fan controller to switch the electrical load from the current mode to the requested mode. In some implementations, the notification can be provided to one or more remote devices that are communicatively coupled to the fan controller. It should be appreciated that the notification can include any suitable type of notification. For instance, in some implementations, the notification can include at least one of an audible notification and a visual notification.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A fan controller for a ceiling fan, the fan controller comprising:
   one or more switching devices configured to selectively couple the ceiling fan to a power source;
   a power meter circuit; and
   one or more control devices configured to:
      obtain, via the power meter circuit, data indicative of power consumption of a fan motor of the ceiling fan;
      determine the fan motor is configured in a first mode of a plurality of modes for the fan motor based, at least in part, on the data indicative of power consumption; and
      in response to determining the fan motor is configured in the first mode, provide a notification to manipulate an input device physically located on the ceiling fan to switch the fan motor from the first mode to a second mode of the plurality of modes.

2. The fan controller of claim 1, wherein:
   when the fan motor is configured in the first mode, the fan motor is decoupled from the power source; and
   when the fan motor is configured in the second mode, the fan motor is coupled to the power source.

3. The fan controller of claim 1, wherein:
   when the fan motor is configured in the first mode, the fan motor rotates fan blades of the ceiling fan at a first speed; and
   when the fan motor is configured in the second mode, the fan motor rotates fan blades of the ceiling fan at a second speed that is faster than the first speed.

4. The fan controller of claim 1, wherein the one or more control devices are further configured to:
   obtain, via the power meter circuit, data indicative of power consumption of a light source of the ceiling fan;
   determine the light source is configured in a first mode of a plurality of modes for the light source based, at least in part, on the data indicative of power consumption; and
   in response to determining the light source is configured in the first mode of the plurality of modes for the light source, provide a notification to manipulate an input device physically located on the ceiling fan to switch the light source from the first mode of the plurality of modes for the light source to a second mode of the plurality of modes for the light source.

5. The fan controller of claim 4, wherein:
   when the light source is configured in the first mode, the light source is decoupled from the power source; and when the light source is configured in the second mode, the light source is coupled to the power source.

6. The fan controller of claim 4, wherein:
when the light source is configured in the first mode, the light source is coupled to the power source such that the light source emits light; and
when the light source is configured in the second mode, the light source is coupled to the power source such that the light source emits light that is brighter than the light the light source emits when configured in the first mode.

7. The fan controller of claim 1, wherein the one or more control devices are configured to provide the notification to a remote device via a communication interface of the fan controller.

8. The fan controller of claim 1, wherein the notification comprises at least one of an audible notification and a visual notification.

9. A fan system, comprising:
a ceiling fan comprising an input device and a fan motor, the fan motor configurable in a plurality of modes; and
a fan controller configured to control power delivery to the ceiling fan, the fan controller comprising:
one or more switching devices configured to selectively couple the ceiling fan to a power source;
a power meter circuit; and
one or more control devices configured to:
obtain, via the power meter circuit, data indicative of power consumption of the fan motor;
determine the fan motor is configured in a first mode of a plurality of modes based, at least in part, on the data indicative of power consumption; and
provide a notification to manipulate the input device of the ceiling fan to switch the fan motor from the first mode to a second mode of the plurality of modes.

10. The fan system of claim 9, wherein input device comprises a pull-chain switch.

11. The fan system of claim 9, wherein:
when the fan motor is configured in the first mode, the fan motor is decoupled from the power source; and
when the fan motor is configured in the second mode, the fan motor is coupled to the power source such that the fan motor rotates fan blades of the ceiling fan.

12. The fan system of claim 9, wherein:
when the fan motor is configured in the first mode, the fan motor is coupled to the power source such that the fan motor rotates fan blades of the ceiling fan at a first speed; and
when the fan motor is configured in the second mode, the fan motor is coupled to the power source such that the fan motor rotates fan blades of the ceiling fan at a second speed that is faster than the first speed.

13. The fan system of claim 9, wherein the ceiling fan further comprises a light source.

14. The fan system of claim 13, wherein the one or more control devices are further configured to:

obtain, via the power meter circuit, data indicative of power consumption of the light source;
determine the light source is configured in the first mode of the plurality of modes based, at least in part, on the data indicative of power consumption; and
provide a notification to manipulate the input device of the ceiling fan to switch the light source from the first mode to a second mode of the plurality of modes.

15. The fan system of claim 14, wherein:
when the light source is configured in the first mode, the light source is decoupled from the power source; and
when the light source is configured in the second mode, the light source is coupled to the power source.

16. The fan system of claim 14, wherein:
when the light source is configured in the first mode, the light source is coupled to the power source such that the light source emits light; and
when the light source is configured in the second mode, the light source is coupled to the power source such that the light source emits light that is brighter than the light the light source emits when configured in the first mode.

17. The fan system of claim 9, wherein the one or more control devices are configured to provide the notification to a remote device via a communication interface of the fan controller.

18. The fan system of claim 9, wherein the notification comprises at least one of an audible notification and a visual notification.

19. A method of controlling a ceiling fan comprising:
obtaining, via a fan controller, data indicative of a user input to configure an electrical load of a ceiling fan in one of a plurality of requested modes;
obtaining, via a power meter circuit, data indicative of power consumption of the electrical load;
determining a current mode of the electrical load based, at least in part, on the data indicative of power consumption;
determining whether the current mode of the electrical load is different than the requested mode associated with the user input;
determining whether the current mode of the electrical load precludes the fan controller from switching the electrical load to the requested mode associated with the user input; and
providing a notification to manipulate one or more input devices physically located on the ceiling fan to switch the fan motor from the current mode to a second mode of the plurality of modes that allows the fan controller to switch the electrical load from the current mode to the requested mode if the fan controller is precluded from switching the electrical load to the requested mode.

20. The method of claim 19, wherein the electrical load is a fan motor and the one or more input devices physically located on the ceiling fan is a pull-chain switch.

* * * * *